United States Patent [19]
Lecourt

[11] 3,765,857
[45] Oct. 16, 1973

[54] FLOTATION PROCESS AND APPARATUS FOR MAKING GLASS

[75] Inventor: Jean Albert Lecourt, Villejuif, France

[73] Assignee: Saint-Gobain Industries, Neuilly-sur-Seine, France

[22] Filed: Dec. 7, 1971

[21] Appl. No.: 205,564

[30] Foreign Application Priority Data
Dec. 22, 1970 France .............................. 7046155

[52] U.S. Cl. .................... 65/91, 65/99 A, 65/146, 65/355, 65/DIG. 4
[51] Int. Cl. .................. C03b 17/00, C03b 18/02
[58] Field of Search ................ 65/91, 99 A, 182 R, 65/355, 356, 146, 147–151, DIG. 4

[56] References Cited
UNITED STATES PATENTS
3,207,591   9/1965   Pfluger ............................ 65/148 X
3,468,649   9/1969   Lajarte et al. ........................... 65/91
3,560,181   2/1971   Lajarte et al. ..................... 65/356 X
3,684,471   8/1972   Matsushita ...................... 65/99 A X
3,452,176   6/1969   Levinson .......................... 65/DIG. 4

Primary Examiner—Robert L. Lindsay, Jr.
Attorney—Willis H. Taylor, Jr. et al.

[57] ABSTRACT

A method of improving the speed of production of flat glass by the flotation method, and of decreasing the thickness of a molten ribbon of flat glass supported on a liquid bath, which comprises heating the metal guide wires and putting them into the molten ribbon at a temperature at which the wires are more perfectly wetted by the molten glass than when the wires are at room temperature and maintaining the wires under tension sufficient to prevent stabilization by the forces of gravity and surface tension, and cooling the sheet.

22 Claims, 7 Drawing Figures

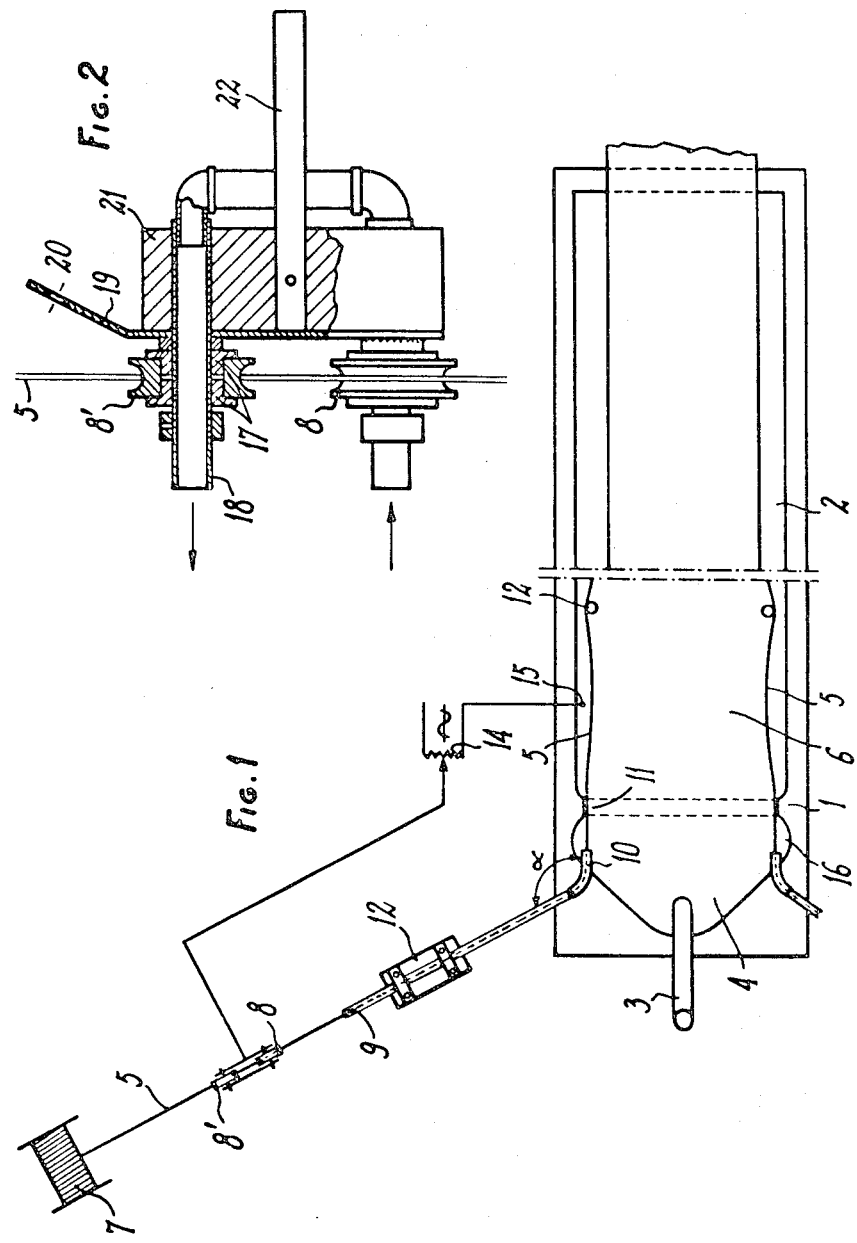

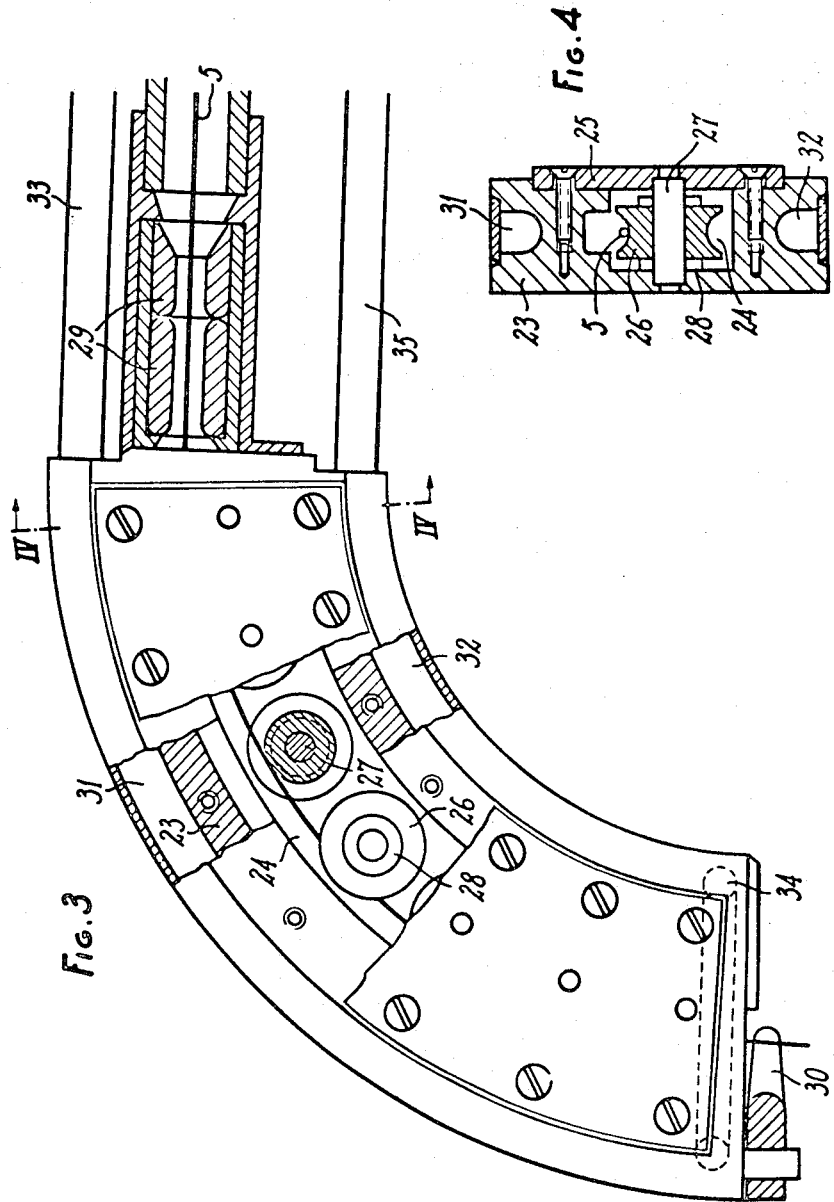

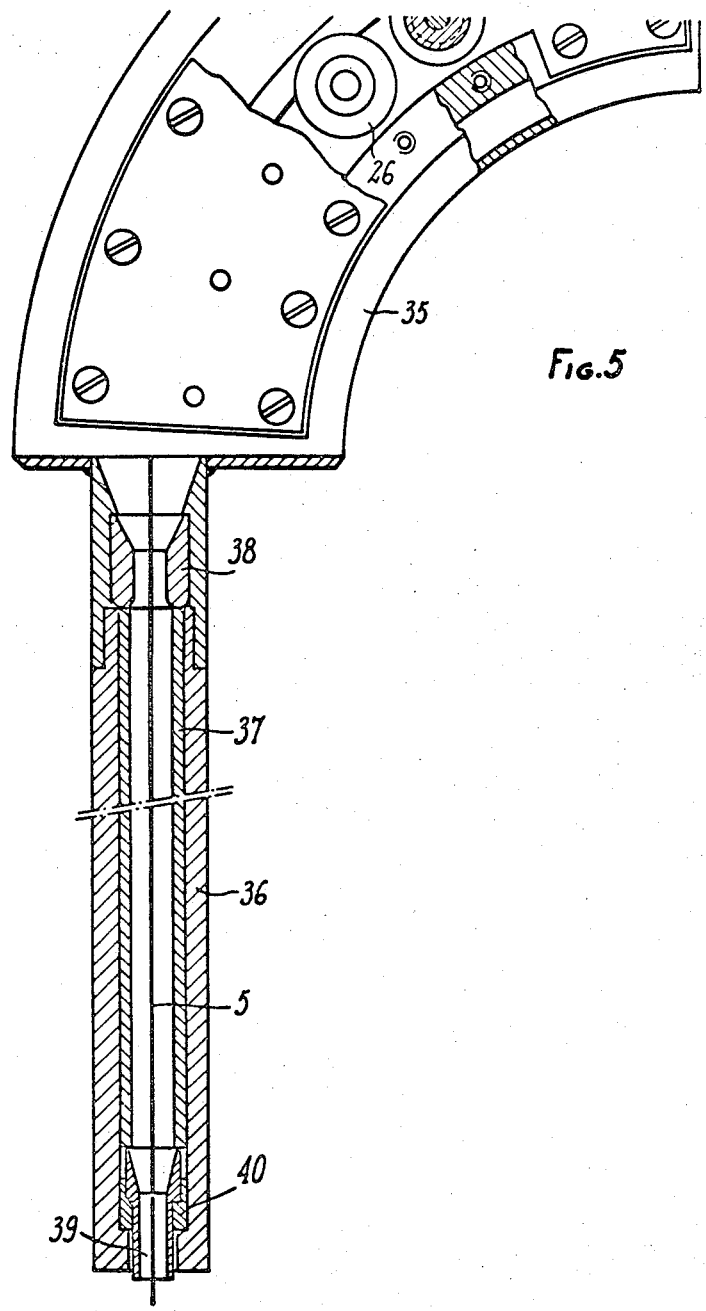

FLOTATION PROCESS AND APPARATUS FOR MAKING GLASS

This invention relates to the manufacture of flat glass by flotation on a bath of molten metal, for instance tin, under the control of moving, flexible guide means which extend from the upstream to the downstream ends of the furnace. Such a process and apparatus are shown in U.S. Pat. No. 3,560,181. In such methods the glass is continuously formed into a sheet and is drawn over the surface of the molten metal at an initial temperature about 1,000° C. for ordinary glass, sometimes called silica-soda-lime glass, and at a speed of 4 or even as high as 5 meters per minute in favorable cases. Such apparatus has been made to reduce the thickness of the glass below that which is provided by stabilization under the forces of gravity and surface tension, which is approximately ¼ in. or 0.55–0.6 cm., for instance producing a wider sheet of thickness about 4 mm.

It is among the objects of this invention to increase the speed of such methods of making flat glass and to make thinner sheets. Other objects are to improve the compatibility of the metal wires, that constitute the guide means, and the glass in order to reduce certain types of damage that may be found to occur in some furnaces. Other objects are to provide the industry with apparatus capable of performing the new objects with efficiency.

The objects are accomplished, generally speaking, by heating the flexible guides to a temperature at which they are immediately wetted by the glass as they are put into it, as the ribbon is formed and put afloat on the flotation bath. This temperature is at least 500°–600° C. and preferably at least 700° C., temperatures on the order of 800°–900° C. being frequently used to introduce the flexible guide means into a glass ribbon of circa 1,000° C. The scope of the invention will be more fully understood from what follows.

When this invention is employed the formation of the ribbon is made more uniform, deformations of its surface are avoided, and the risk of breaking the sheet or breaking the guide wires is materially reduced, and the speed of manufacture can be at or above 5 m/min. with improved results. These advantages are apparently derived from my discovery that the guide wires are better wetted by glass at about 1,000° C. when at high temperature than under the conditions previously used, and this improves both the incorporation of the wires into and their acceptance by the glass. These effects are especially prominent when the ribbon of glass is very thin.

In a very advantageous form of the invention the guide wires are heated by Joule effect, the current passing through the metal bath, the glass ribbon, and the wire from some common source of industrial electrical power, but the heating need not involve the bath or the glass but may be applied to a length of the wire before it enters the glass, assisted if the distance from the heaters to the glass be long by auxiliary heating means adapted to maintain the selected temperature.

The invention also includes apparatus for passing current through the guide elements and to guide them on their passage to and into the ribbon.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic view of a flotation apparatus, foreshortened, illustrating the preferred apparatus and method of heating the guide element and putting it into the glass;

FIG. 2 is a part section parallel to the guide element of the electric connection which supplies current to the moving element;

FIG. 3 is a part section parallel to the guide element of a temperature controlled, curved part of the guide system for the guide element as it approaches the bath;

FIG. 4 is a section on line IV—IV of FIG. 3;

FIG. 5 is a section parallel to the guided element illustrating the prolongation of the guide beyond the curved part of FIG. 3;

Figure 6:
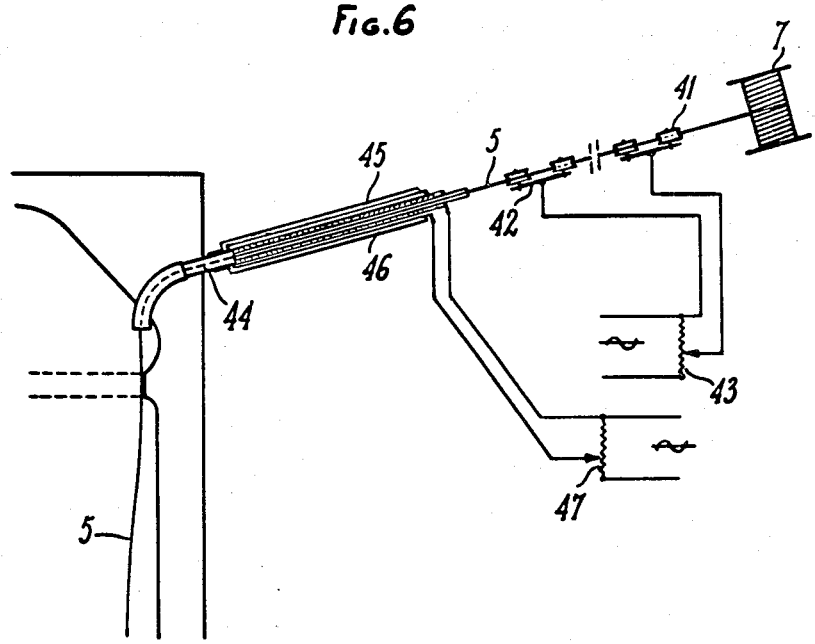
FIG. 6 is a diagrammatic plan view of a modification.

In using the terms guide element, wire and the like, we include wires, cords, ribbons, braided strands and the like, which are usually made of refractory steel. The simplest and often the best guide element is a simple wire of inoxidizable (stainless) steel about 1.6 mm. in diameter, and this is the type chosen for illustration, it being understood that particular circumstances may lead to the use of ribbons or braided forms.

In FIG. 1 the enclosure of the flotation furnace is partly shown at 1, containing a metal bath 2, usually molten tin, under a nonoxidizing, inert atmosphere such as nitrogen. The molten glass flows through conduit 3 at the upstream end of the furnace into the fore-basin 4, fills it, flows over a weir at a chosen depth, for instance ¼ inch, and receives near each edge a guide wire 5 and is rapidly drawn into a ribbon the width and thickness of which is established by the guide wires embedded in it.

Each wire 5 is led from a reel 7 under and over a pair of grooved wheels 8'—8, enters and passes through tubular conduit 9 which has a curved part 10 near the fore-basin which guides the wire in an arcuate change of direction about an angle alpha which is a function of the directions of approach and penetration into the glass of the ribbon before it passes over the weir 11. Supports 12 hold the guide 9–10 in fixed position after it has been adjusted in proper alignment to insert the wire into the glass at the correct depth. Guides 9 and 10 are tubular and composed of non-conductive insulating material.

An electric current of heating intensity taken from a commercial main 14 is delivered to the grooved wheels or pulleys 8'—8 which transmit it to the wire, whereas the other pole of the source is connected as by an electrode 15 to the tin bath, by it to the glass ribbon floating on the bath, and to the wire 5 in the ribbon. The glass is conductive at its high temperature. The source of current is regulatable.

In a specific example the distance between electrified pulleys 8'—8 and the fore-basin 16 where the wire entered the glass was 2.5 meters, the speed of the flat glass ribbon and the wires was 5 m/min., the voltage applied was 35, and the temperature of the wire as it entered the glass was over 900° C.

In practice, the electrode 15 is not essential as the lead wire can be grounded in the hot wall of the furnace with similar results.

FIG. 2 shows in detail the construction and support of the live pulleys which bring the current to the wire. The pulleys 8'—8 are made of conductive metal, e.g. copper, which turn freely on small split bearings 17, of low coefficient of friction, e.g. graphite, which are assembled in pairs on pipe axles 18 of U-shape which carry cooling water. The axles are mounted in and supported by a block of insulation 21, e. g. bakelite, which is in turn supported by a beam 22 of nonconductive material. The current is brought to the pulleys by a metal terminal 19 which is spaced from the bearings by metal washers, the units being assembled by nuts riding on screw threads on the axles 18. The cooling circuit may be insulated if desired. The pulleys are preferably arranged so as to provide contact with a substantial length of the wire to provide good contact.

FIGS. 3 and 4 show in detail the novel construction for carrying the wire in an arcuate path toward the fore-basin, the curved section being the part 10 of FIG. 1. The part is arcuate in length and C shaped in cross section, the opening of the C being covered by a plate 25 when the parts are assembled. A series of pulleys 26, freely mounted on axles 27 carry the wire 5. The axles are mounted in seats in the body and in the cover. Washers 28 space the pulleys from the sides. When the wire is under service tension it makes the pulleys turn freely. Parts 26, 27, 28 are of insulating material and are not grounded; for instance the washers may be bronze and the pulleys and axles of alumina or tungsten carbide. At the entrance to arcuate conduit cylindrical guides 29 with a flared end receive the wire and guide it to the pulleys, and at the other end a U-shaped guide 30 prevents contact with the housing 23. Guides 29 and 30 are made of very hard material, resistant to high temperature, and electrically nonconductive, e.g. alumina. Grooves 31, 32 covered by cap plates 31', formed in the outer arcs of the housing 23 and joined by a bypass 34 at the lower end carry cooling water from pipes 33 and 35, cooling the apparatus and permitting it to sustain long exposure to the high temperatures at the fore-basin. It may also be covered with thermal insulation.

In FIG. 5 the housing 10–23 is extended by a straight guide 36 similar to 9, of which both are comprised of a refractory metal tube 36 lined by a refractory tube 37 of insulating material, e. g. alumina or ceramic. At the entrance of this guide is a flared ring 38 of lesser interior diameter and at the other end a similar flared ring 39 mounted in the tube 36 by insulating ring 40. All these parts may contact the wire and should be hard, refractory, and dielectric or insulated by dielectric material. Ring 39 must resist abrasion by the wire which may not be exactly centered; tungsten carbide is a satisfactory material for this use. The linear prolongation allows the wire to be delivered at the surface of the molten glass and to better control its position as it enters the glass.

Figure 7:
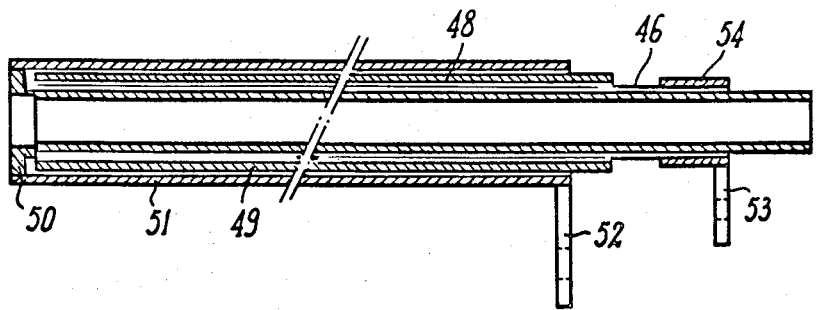
FIG. 7 is a longitudinal section through auxiliary heating means for the guided element.

In the modification illustrated in FIGS. 6 and 7 heating by Joule effect is limited to the wire itself and does not involve the molten metal or the glass. Two pairs of guide pulleys 41–42 are supplied with current, from source 43, which flows through and heats the wire 5 to the selected temperature, 800°–900°C. The wire then enters an auxiliary heater 45–46 of, in this instance, resistance type which maintains its temperature until it is delivered to the glass.

In region 44 the conduit is as described in FIG. 5 but upstream it is formed of a steel tube 45 of larger diameter in which is placed a heating element of resistance type (FIG. 7) including a tubular resistance 46 supplied by variable source 47. This resistance is lodged between refractory, insulating tubes 48–49 and at its downstream end it is connected by welding to a ring 50 which is united with a metal tube 51 of refractory steel. Current leads 52–53 are united to tubes 51 and rings 54 respectively, which is connected to the upstream end of resistance 46. The metal consitututing the resistance 46 may be of any satisfactory refractory type, e. g. nickel-chrome. In the example described, the thickness of the tube is 0.5 mm. and the length of the element 45 is of the order of a meter. It provides an internal temperature of 1,000° C. when source 47 supplies a current of 150A at 11 V. This construction has the advantage of superior temperature control of the wire, providing uniformity as it enters the glass.

The resistance heater 45 can be used as the sole heating element in some cases and it is possible to use all the guides and heating means alone, or in various combinations to heat the wire and make uniform its temperature as it enters the glass. A double circuit of Joule effect heating can be provided to heat different lengths of the wire differently. Other heating means of use in the invention are tubular furnaces, flame, induction by high frequency current, and a fluidized hot bed. The wires can be introduced along curved paths, as in the description, or along straight lines as in the cited patent.

The advantages of the invention are shown by the ability of furnaces so equipped to increase their output of glass sheet in a given time and to reduce the thickness of the ribbon that can be successfully drawn. For example a furnace which had previously produced satisfactory glass of ordinary composition 4 mm. thick at 5 m/min., after installation of this invention and without other change in operating conditions, produced flat glass 2.2 mm. thick at 9 m/min., the wires being at 800° C. as they entered the glass, and the glass being at about 1,000° C.

The apparatus operates by forming a ribbon of glass which is drawn over the surface of a molten tin bath, being progressively cooled to a degree sufficient to harden its surfaces before it is withdrawn from the flotation bath. If it were allowed to cool naturally it would stabilize itself at a width and thickness dictated by the forces of gravity and surface tension, which is proper for those types of glass which are to be annealed or tempered for numerous uses; that thickness is about ¼ inch. However, when the glass is to be used in laminating safety windshields such thicknesses are inacceptable and the forces of gravity and surface tension are defeated by embedding wires in the edges of the molten ribbon and putting the wires under tension, producing a thinner and wider sheet. This can be followed in FIG. 1 by observing the shape of wire 5 between element 10 and post 12 outside of which the wire passes. In prior practice the best that could be done in regular production was a sheet reduced to about 4 mm. thickness, quite suitable for lamination, but by no means ideal. The speed of production at this thickness approached a maximum between 4 and 5 m/min.

In the present invention the speed of production is almost doubled and the thickness of the glass reduced by almost one half. It will be understood that different furnaces will have different capacities in these categories related to particular construction but it is believed that the foregoing figures represent a reasonable approximation of the merits of the invention as applied to any standard flotation system.

As many apparently widely different embodiments of the present invention may be made without departing from the spirit and scope thereof, it is to be understood that the invention is not limited to the specific embodiments.

What is claimed is:

1. In the manufacture of flat glass by the flotation method in which molten glass is formed into a ribbon and drawn over a flotation bath, and in which at least one guide wire is introduced into the glass at the upstream length of the ribbon, the improvement which, independently of the molten glass, comprises pre-heating successive lengths of the guide wire to at least about 550° C. and feeding the thus pre-heated length of wire lengthwise into the margin of the glass.

2. A method according to claim 1 in which the wires are pre-heated to a temperature of at least 700° C., and fed into the margins of the glass at places where the glass is at a higher temperature.

3. A method according to claim 1 which includes the step of heating the guide wire, before admission to the molten glass, by Joule effect.

4. A method according to claim 1 in which the ribbon of molten glass is formed at a temperture circa 1,000° C., a wire is fed into the glass to extend lengthwise near each edge of the ribbon, each wire is heated to a temperature on the order of 700°-900° C. before being fed into the glass, the wires are put under tension sufficient to reduce the ribbon to a thickness on the order of 2.2 mm., and the ribbon and wires are drawn over the bath at a speed of more than 5 m/min.

5. In the manufacture of flat glass by the flotation method in a flotation furnace in which molten glass is formed into a ribbon and drawn over a flotation bath, and in which an elongated guide is continuously fed lengthwise into the molten glass at the glass input end of the furnace, is moved downstream with and embedded in the margin of said ribbon and is removed from the ribbon at the delivery end of the furnace, the improvement which comprises continuously pre-heating externally of the furnace a length of said moving guide to be fed lengthwise into the glass whereby the temperature of the guide as it is fed into the molten glass is at least 500° C.

6. Apparatus for the continuous manufacture of flat glass comprising a molten flotation bath, means to form a molten ribbon of flat glass and draw it over the surface of the baTh, means to introduce linear guide means into the upstream part of the marginal portion of the glass, and means independent of heat conducted from the molten glass to heat the guide means to several hundred degrees C above room temperature before introduction of the guide means into the glass.

7. Apparatus according to claim 6 in which the heating means includes means for supplying electrical current and operates by Joule effect.

8. Apparatus according to claim 7 including means to connect one pole of the means for supplying electrical current to the linear guide means at a location preceding entry of the guide means into the glass, and means to connect the other pole thereof to the molten ribbon on the flotation bath.

9. Apparatus according to claim 7 wherein the Joule effect heating means includes conductor means connecting the poles of the means for supplying electrical current to spaced parts of the linear guide means externally of the glass.

10. Apparatus according to claim 9 including insulating, heated guide means enclosing the linear guide means between the heating means and the molten ribbon of glass.

11. Apparatus according to claim 7 in which the contact between the means for supplying electrical current and the linear guide means comprises spaced current conducting wheels connected to opposite poles of the means for supplying electrical current and contacted by the linear guide means.

12. Apparatus according to claim 8 including electrically insulating tubular guide means for the hot linear guide means in advance of the point of entry of the linear guide means into the molten glass.

13. Apparatus according to claim 7 including guide means having a series of pulleys arcuately arranged and bearing the linear guide means toward the ribbon, means to house the pulleys, and means to cool the housing.

14. Apparatus according to claim 11 in which the wheels are circumferentially grooved and rotatably supported on cooled, electrically conductive bearings.

15. Apparatus according to claim 6 comprising a supply or refractory wire delivering wire angularly toward the path of the glass through the furnace and means to align the wire parallel to the path of the glass comprising a plurality of arcuately arranged pulleys, a housing therefor, guide means aligning the wire with the first of the pulleys, guide means for the wire leaving the housing, and means to control the temperature of the housing.

16. Apparatus according to claim 15 in which the guide means for the wire leaving the housing comprises a refractory metal tube lined with a refractory dielectric sleeve.

17. The method defined in claim 5, wherein the guide is in the form of a wire embedded in said ribbon near the edge thereof.

18. The method as defined in claim 16 which comprises pre-heating said length of the guide electrically by Joule effect.

19. The method as defined in claim 18 which comprises simultaneously heating by Joule effect a length of the guide embedded in an upstream portion of the body of molten glass.

20. The method as defined in claim 19 which comprises passing electrical current through said lengths of the guide in series from a common source of electrical energy to heat the same.

21. The method as defined in claim 5 which comprises continuing to heat said guide within the molten glass independently of heat conducted thereto from the molten glass.

22. The method as defined in claim 21 wherein said continued heating of the wire within the molten glass is by Joule effect.

* * * * * p0-1050
(5/69)

UNITED STATES PATENT OFFICE
CERTIFICATE OF CORRECTION

Patent No. 3,765,857      Dated October 16, 1973

Inventor(s) Jean Albert Lecourt

It is certified that error appears in the above-identified patent and that said Letters Patent are hereby corrected as shown below:

Column 5, line 19, for "length" substitute --end--.
Column 6, line 48, for "16" substitute --5--.

Signed and sealed this 9th day of April 1974.

(SEAL)
Attest:

EDWARD M. FLETCHER, JR.
Attesting Officer

C. MARSHALL DANN
Commissioner of Patents